United States Patent
Bader et al.

(10) Patent No.: US 9,500,135 B2
(45) Date of Patent: Nov. 22, 2016

(54) FUEL FEED CIRCUIT FOR AN AEROENGINE HAVING A HIGH PRESSURE PUMP SYSTEM WITH TWO PUMPS

(75) Inventors: Nicolas Alain Bader, Vaux le Penil (FR); Regis Michel Paul Deldalle, Servon (FR); Laurent Gilbert Yves Hodinot, Cesson (FR); Nicolas Potel, Maisons Alfort (FR)

(73) Assignee: SNECMA, Paris (FR)

( * ) Notice: Subject to any disclaimer, the term of this patent is extended or adjusted under 35 U.S.C. 154(b) by 1041 days.

(21) Appl. No.: 13/500,499

(22) PCT Filed: Sep. 30, 2010

(86) PCT No.: PCT/FR2010/052063
§ 371 (c)(1),
(2), (4) Date: May 24, 2012

(87) PCT Pub. No.: WO2011/042641
PCT Pub. Date: Apr. 14, 2011

(65) Prior Publication Data
US 2012/0260658 A1  Oct. 18, 2012

(30) Foreign Application Priority Data

Oct. 6, 2009  (FR) ..................................... 09 56950

(51) Int. Cl.
*F02C 7/22* (2006.01)
*F02C 7/236* (2006.01)
(Continued)

(52) U.S. Cl.
CPC .............. *F02C 9/263* (2013.01); *F02C 7/236* (2013.01); *F02C 9/30* (2013.01); *F02C 7/22* (2013.01); *F02C 9/26* (2013.01); *F02C 9/36* (2013.01)

(58) Field of Classification Search
CPC ............ F02C 7/22; F02C 7/236; F02C 9/36; F02C 9/263; F02C 9/30; F02C 9/26

USPC .......................... 60/734, 39.281; 137/625.35
See application file for complete search history.

(56) References Cited

U.S. PATENT DOCUMENTS 5,245,819 A * 9/1993 Kast ................................ 60/734
5,463,863 A * 11/1995 Severn ...................... F02C 9/28
60/39.48

(Continued)

FOREIGN PATENT DOCUMENTS

EP  1329617 A2 * 7/2003 ............. F02C 7/236
EP  1 557 546      7/2005

(Continued)

OTHER PUBLICATIONS

U.S. Appl. No. 13/500,756, filed Apr. 6, 2012, Bader et al.

(Continued)

*Primary Examiner* — Gerald L Sung
*Assistant Examiner* — Eric Linderman
(74) *Attorney, Agent, or Firm* — Oblon, McClelland, Maier & Neustadt, L.L.P.

(57) ABSTRACT

A fuel feed circuit for an aeroengine, the circuit including a high-pressure pumping system for delivering fuel at high pressure to combustion chamber injectors, the high-pressure pumping system including first and second positive displacement gear pumps driven simultaneously by the engine. A hydraulic switch member is interposed between respective outlets of the pumps, which makes it possible, in one state, to combine outlet flows from the two pumps to deliver fuel at high pressure to the combustion chamber injectors, and in another state, to discharge some or all of outlet flow from the first pump to a low-pressure feed line, an electrical control member serving to cause the hydraulic switch member to pass from one state to the other.

6 Claims, 2 Drawing Sheets

(51) Int. Cl.
*F02C 9/36* (2006.01)
*F02C 9/26* (2006.01)
*F02C 9/30* (2006.01)

(56) References Cited

U.S. PATENT DOCUMENTS

| | | | |
|---|---|---|---|
| 6,385,960 B1* | 5/2002 | Kress et al. | 60/778 |
| 8,038,416 B2* | 10/2011 | Ono | F04C 14/26 137/565.15 |
| 8,172,551 B2* | 5/2012 | Baker | F02C 7/236 417/2 |
| 8,511,414 B2* | 8/2013 | O'Shea | F02C 7/232 180/69.4 |
| 8,789,353 B2* | 7/2014 | Bickley | F02C 7/232 60/39.281 |
| 8,991,152 B2* | 3/2015 | Heitz | F02C 7/22 60/243 |
| 2002/0038540 A1* | 4/2002 | Griffiths et al. | 60/39.281 |
| 2005/0050897 A1* | 3/2005 | Lewis | 60/764 |
| 2005/0262824 A1* | 12/2005 | Yates | F02C 7/232 60/39.281 |
| 2006/0016198 A1* | 1/2006 | Stuttaford et al. | 60/776 |
| 2006/0236981 A1* | 10/2006 | Bickley | F01D 21/00 123/506 |
| 2008/0028742 A1 | 2/2008 | Parsons | |
| 2008/0289338 A1 | 11/2008 | Desai | |
| 2011/0289925 A1* | 12/2011 | Dyer | F02C 7/232 60/734 |

FOREIGN PATENT DOCUMENTS

| | | | |
|---|---|---|---|
| EP | 1 715 161 | 10/2006 | |
| EP | 1726879 A2 * | 11/2006 | F02C 7/236 |
| FR | 2 764 336 | 12/1998 | |
| GB | 1 439 764 | 6/1976 | |
| WO | 2007 044020 | 4/2007 | |

OTHER PUBLICATIONS

U.S. Appl. No. 13/978,470, filed Jul. 5, 2013, Potel et al.
International Search Report Issued Dec. 29, 2010 in PCT/FR10/52063 Filed Sep. 30, 2010.

* cited by examiner

FUEL FEED CIRCUIT FOR AN AEROENGINE HAVING A HIGH PRESSURE PUMP SYSTEM WITH TWO PUMPS

BACKGROUND OF THE INVENTION

The invention relates to a fuel feed circuit for an aeroengine, and more particularly to a circuit that delivers fuel for feeding combustion chamber injectors of the engine and optionally for use as a hydraulic fluid for controlling actuators of variable-geometry members of the engine.

Usually, a fuel feed circuit of an aeroengine has a pump system made up of a low-pressure pump associated with a high-pressure pump. The high-pressure pump is generally in the form of a positive displacement gear pump of constant cylinder capacity that is driven by the engine via an accessory gearbox (AGB). The function of the pump is to deliver fuel at high pressure to the combustion chamber injectors and to the actuators of the variable-geometry members of the engine.

In certain fuel feed circuits, the high-pressure pump is a two-stage pump, i.e. it presents two different stages of gears that are driven simultaneously by the engine and that have different cylinder capacities. With this type of pump, one of the stages is dedicated specifically to feeding the combustion chamber injectors, while the other stage is dedicated to feeding actuators for actuating variable-geometry members of the engine.

Whatever the configuration selected for the high-pressure pump, the rate at which fuel is delivered does not match the real needs of the engine and it exceeds those needs over a wide range of speeds of rotation of the engine. The flow of fuel that is not consumed by the fuel circuit during those speeds of rotation of the engine is therefore returned upstream from the high-pressure pump.

Such forced return of the fuel gives rise firstly to mechanical power being drawn to drive the high-pressure pump, which power does not contribute to the thrust from the engine, and secondly to a rise in the temperature of the fuel. This heating of the fuel has an impact on the overall temperature of the engine since the fuel constitutes the "cold" fluid while the oil constitutes the "hot" fluid. As a result the capacity for cooling by means of the fuel is reduced such that heat needs to be dissipated into the air by means of air/oil heat exchangers, with this being to the detriment of weight, space for installation, and drag.

OBJECT AND SUMMARY OF THE INVENTION

A main object of the present invention is thus to mitigate such drawbacks by proposing a fuel feed circuit for an aeroengine that makes it possible in simple and reliable manner to deliver fuel to the combustion chamber injectors and to the variable-geometry actuators of the engine while using different cylinder capacities.

This object is achieved by a fuel feed circuit for an aeroengine, the circuit comprising a high-pressure pumping system for delivering fuel at high pressure to combustion chamber injectors from a low-pressure feed line, the high-pressure pumping system having first and second positive displacement gear pumps driven simultaneously by the engine, the fuel feed circuit being characterized in that it further comprises:

a hydraulic switch member interposed between the respective outlets of the pumps and making it possible in one state to combine the outlet flows from the two pumps in order to deliver high-pressure fuel to the combustion chamber injectors, and in another state, to discharge some or all of the outlet flow from the first pump to the low-pressure feed line; and an electrical control member for controlling the hydraulic switch member in order to cause it to pass from one state to the other.

The fuel circuit pumps of the invention have different cylinder capacities. In particular, the first pump preferably has pumping capacity that is greater than that of the second pump. Thus, depending on the operating point of the engine, it is possible to cause the switch member to ensure that the delivered flow of fuel comes either from both pumps, or else from only one of them (specifically the second pump). For example, on starting the engine, which requires a high flow rate of fuel, the switch member may be operated so that the delivered fuel flow comes from both pumps. At operating points between idling and cruising, points that do not require such a high flow rate, the switch member is operated so that the delivered flow of fuel comes from the second pump only. Finally, for operating points beyond the cruising points, the switch member is operated so that the flow of fuel that is delivered comes from both pumps.

Compared with known solutions in the prior art, the fuel circuit of the invention thus presents considerable improvements both in terms of thermal power (by limiting the amount of fuel that has been raised to high pressure and then subsequently returned) and in terms of the amount of mechanical power that is taken off (where such mechanical takeoff that does not contribute to engine thrust can be reduced).

Furthermore, the circuit is simple to implement since it requires the provision only of a hydraulic switch member and of an electrical control member. There is no impact on the other components of the fuel circuit, and in particular there is no impact on the regulator valve or the fuel metering unit.

The fuel circuit of the invention also presents great flexibility in use. In particular for operating points in the range idling to cruising and in which only one pump is active, it is possible, under icing conditions that require the fuel to be heated, to act on the switch member so as to activate the other pump. Furthermore, in the event of overspeed it is possible to switch off the first pump under electrical control so as to reduce the rate at which fuel is injected to a rate that corresponds to the maximum cruising speed.

Finally, the fuel circuit of the invention has the advantage of being suitable for optimizing the dimensioning of the cylinder capacity of the second pump in order to obtain better thermal improvements and better mechanical takeoff improvements.

Preferably, the switch member comprises a hydraulic switch member interposed between the respective outlets of the pumps and comprising a hydraulic directional control valve having a feed orifice connected to the outlet of the first pump, a high-pressure delivery orifice connected to the outlet of the second pump, and a low-pressure delivery orifice connected to the low-pressure feed line by a fuel return pipe, the feed orifice being capable of being connected to the high-pressure delivery orifice or to the low-pressure delivery orifice, as a function of the controlled position of a slide of the hydraulic valve in order to combine the outlet flows from the two pumps or else in order to discharge some or all of the outlet flow from the first pump to the low-pressure feed line.

The electrical control device may comprise a solenoid valve placed on a fuel branch pipe connected firstly to the return pipe and secondly to one of the pilot chambers of the hydraulic valve. Under such circumstances, the other pilot chamber of the hydraulic valve is connected to the outlet of the second pump, the pilot chambers of the hydraulic valve communicating with each other through a diaphragm.

Alternatively, the electrical member for controlling the switch member may comprise a solenoid valve placed on the fuel return pipe. Under such circumstances, the solenoid valve may be of the on/off type or of the flow rate regulator type.

The invention also provides an aeroengine including a fuel feed circuit as defined above.

BRIEF DESCRIPTION OF THE DRAWINGS

Other characteristics and advantages of the present invention appear from the following description given with reference to the accompanying drawings that show embodiments having no limiting character. In the figures:

FIGS. 1 and 1A show a first embodiment of a fuel feed circuit in accordance with the invention.

DETAILED DESCRIPTION OF EMBODIMENTS

Figure 1:
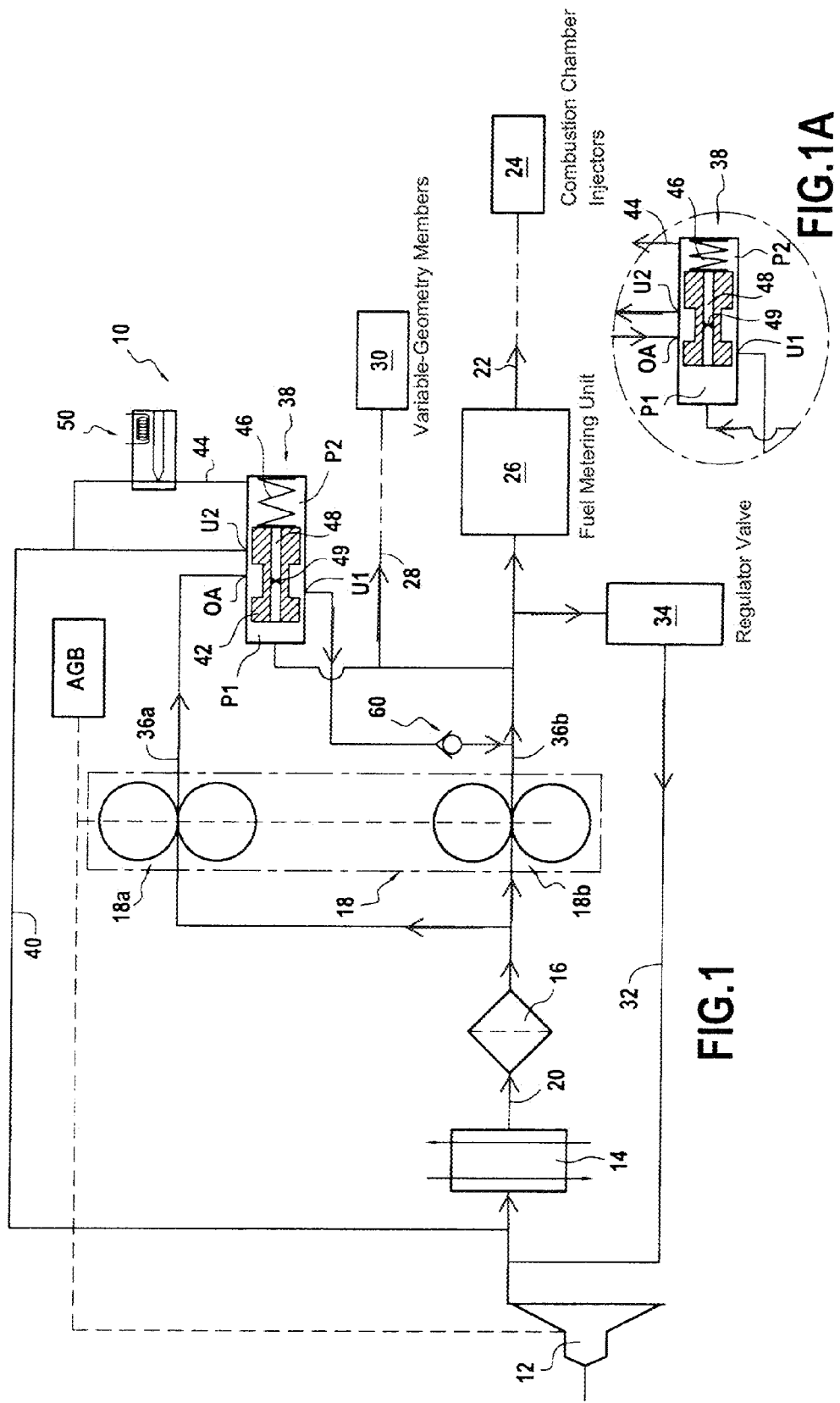

A first embodiment of a fuel feed circuit in accordance with the invention is described below with reference to FIGS. 1 and 1A in the context of an application to a gas turbine airplane engine. Nevertheless, the field of application of the invention extends to gas turbine engines for other aircraft, in particular helicopters, and to aeroengines other than gas turbines.

The fuel feed circuit 10 of this first embodiment of the invention comprises, in conventional manner, a low-pressure pump 12, a fuel/oil heat exchanger 14, a main fuel filter 16, and a high-pressure pumping system 18 (the positions of the heat exchanger 14 and of the filter 16 are shown by way of example; it is possible for these elements to be positioned in other ways).

The low-pressure pump 12 is connected on the upstream side to the fuel tanks of the airplane (not shown), and on the downstream side to the high-pressure pumping system 18 via a low-pressure feed line 20.

At the outlet from the high-pressure pumping system 18, the fuel feed circuit 10 splits into a plurality of distinct fuel lines, namely: a fuel line 22 for feeding fuel to combustion chamber injectors 24, with the rate at which fuel is injected to the injectors being metered in known manner by a fuel metering unit 26; another fuel line 28 for powering actuators of variable-geometry members 30 of the engine; and a fuel return line 32 provided with a regulator valve 34 for returning the flow of fuel that is not used to the low-pressure feed line 20.

The high-pressure pumping system 18 is of the two-stage type, i.e. it is made up of two positive displacement gear pumps 18a and 18b that are driven simultaneously by the engine and that deliver different cylinder capacities. More precisely, the first pump 18a has a cylinder capacity that is greater than that of the second pump 18b, i.e. in operation, it is capable of injecting fuel at a rate that is greater than the rate at which fuel is injected in operation by the second pump. In other words, the first pump 18a of the high-pressure pumping system has pumping capacity that is greater than that of the second pump 18b.

The low-pressure pump 12, and also the two pumps 18a and 18b of the high-pressure pumping system 18 are driven simultaneously by the high-pressure shaft of the engine via an AGB.

According to the invention, the fuel feed circuit 10 also includes a hydraulic switch member that is interposed between the respective outlets 36a and 36b of the two pumps 18a and 18b of the high-pressure pumping system, together with an electrical control member for controlling the switch member.

In the first embodiment of FIGS. 1 and 1A, the switch member is in the form of a hydraulic directional control valve 38. Under the action of the electrical control member, the hydraulic valve 38 can take up two different positions: a first position in which the outlets 36a and 36b of the two pumps 18a and 18b are in communication with each other so as to combine their flows in order to deliver high-pressure fuel to the combustion chamber injectors 24 and to the variable-geometry actuators 30 (see FIG. 1); and a second position in which the outlet from the first pump 18a communicates with a fuel return pipe 40 in order to discharge all of the outlet flow from the pump 18a to the low-pressure feed line 20 (see FIG. 1A).

More precisely, the hydraulic valve 38 includes a feed orifice OA connected to an outlet 36a of the first pump 18a, a high-pressure delivery orifice U1 connected to the outlet 36b of the second pump 18b, and a low-pressure delivery orifice U2 connected to the fuel return pipe 40.

The valve 38 also has a slide 42 that is movable in linear translation inside a cylinder under the action of the electrical control member. The position of the slide defines the two above-described positions: in the first position, the feed orifice OA is connected to the high-pressure delivery orifice U1 so that the outlets 36a and 36b of the two pumps are in communication with each other, and the low-pressure delivery orifice U2 is masked (FIG. 1); in the second position, the feed orifice OA communicates with the low-pressure delivery orifice U2 so as to enable fuel to be returned to the low-pressure feed line 20 via the return pipe 40, and the high-pressure delivery orifice U1 is masked (FIG. 1A).

The valve 38 also has two pilot chambers, namely: a first pilot chamber P1 connected to the outlet 36b of the second pump 18b; and a second pilot chamber P2 connected to a branch pipe 44 that is described below and in which a spring 46 is located. Furthermore, the pilot chambers P1 and P2 communicate with each other by means of a channel 48 passing right through the slide 42 and having a diaphragm 49 mounted therein.

The electrical control member for controlling the valve serves to act on the pressure applied in the second pilot chamber P2, with the pressures applied in the pilot chambers P1 and P2 acting in opposition against each other to control the movement of the slide 42 of the valve.

To this end, the electrical control member of the valve comprises a solenoid valve 50 (i.e. an electrically controlled valve) that is placed in the branch pipe 44, the pipe being connected firstly to the fuel return pipe 40 and secondly to the second pilot chamber P2 of the valve.

This solenoid valve 50 is of the on/off type: when powered electrically, the solenoid valve is open and fuel can flow in the branch pipe 44 between the second pilot chamber P2 and the fuel return pipe 40. However, when the valve is not electrically powered, it is closed and no flow of fuel flows in the branch pipe. In a variant embodiment, the solenoid valve may be of the type presenting a regulated flow rate.

Thus, when the solenoid valve 50 is not powered, the pressure inside the first chamber P1 is equivalent to the high pressure $P_{HP}$ at the outlet 36b of the second pump 18b. Since the branch pipe 44 is closed, the pressure that exists in the second chamber P2 is equivalent to the pressure $P_{HP}$ (this pilot chamber P2 communicates with the other pilot chamber P1 via the channel 48), plus the pressure exerted by the spring 46. Thus, the force in the second chamber P2 is greater and the slide 42 of the hydraulic valve moves into the first position (as shown in FIG. 1 where the outlets of the two pumps are in communication with each other).

When the solenoid valve 50 is powered, the pressure inside the first chamber P1 remains equivalent to the high pressure $P_{HP}$. Since the branch pipe 44 is now open, the pressure that exists in the second chamber P2 is equivalent to the pressure $P_{LP}$ that exists at the outlet from the low-pressure pump (this pilot chamber P2 communicates with the low-pressure feed line 20 via the branch pipe 40 and the return pipe 44), plus the force exerted by the spring 46. Thus, the pressure in the first chamber P1 is greater and the slide 42 of the hydraulic valve moves into the second position (as shown in FIG. 1A where the flow injected by the first pump is returned).

The solenoid valve 50 is controlled by the engine control unit (ECU) that delivers the electrical power needed for powering the valve.

Furthermore, it is possible to imagine variants of this first embodiment. In particular, the slide of the hydraulic valve and the solenoid valve could be united in a single component.

Figures 2, 2A:
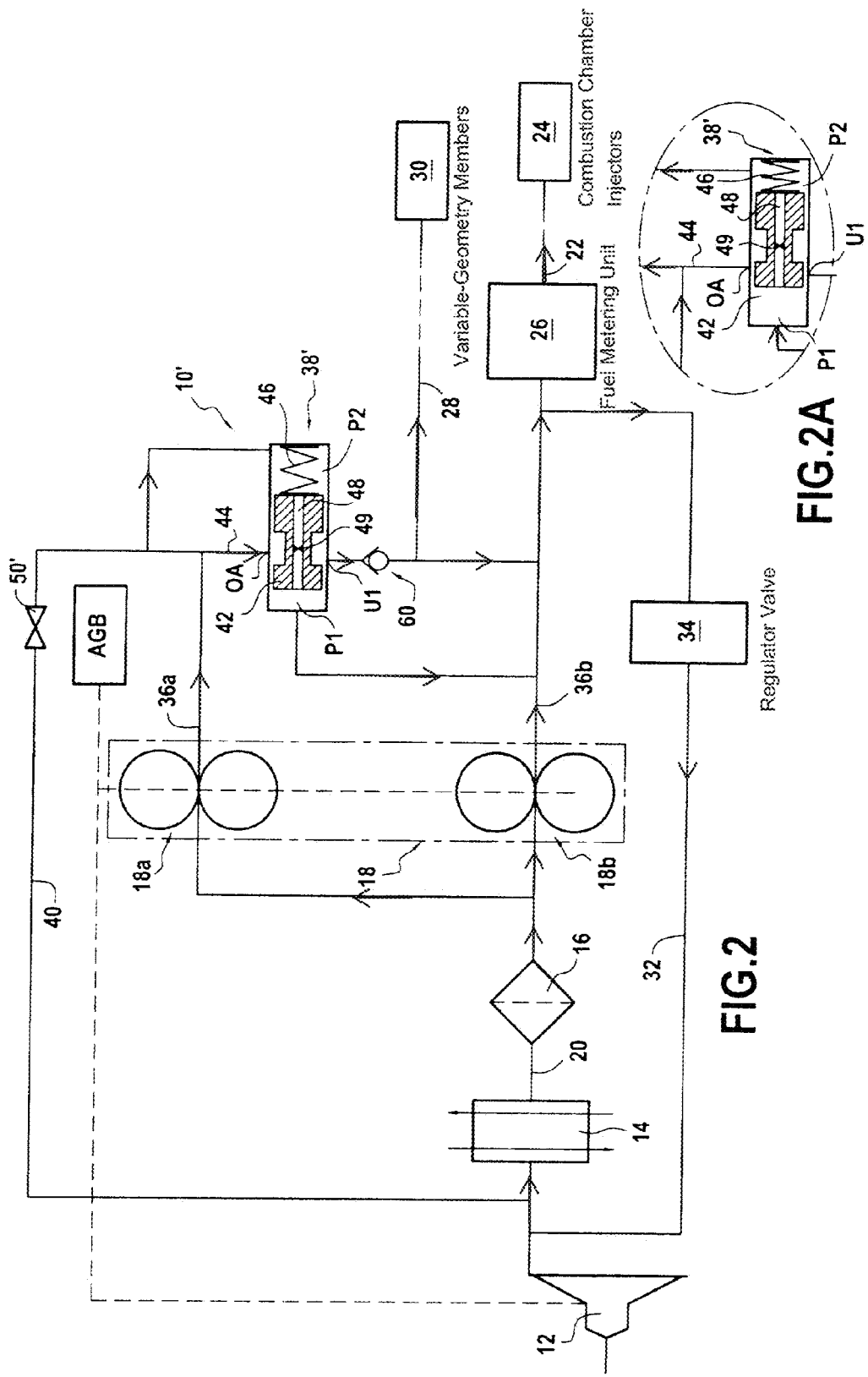
FIGS. 2 and 2A show a second embodiment of a fuel feed circuit in accordance with the invention.

With reference to FIGS. 2 and 2A, there follows a description of a fuel feed circuit 10' in a second embodiment of the invention.

The circuit 10' differs from the circuit of the first embodiment in particular in that the hydraulic valve 38' has a feed orifice OA connected to the outlet 36a of the first pump 18a and only one delivery orifice U1 that is connected to the outlet of the second pump 18b.

Furthermore, the electrical control member for controlling this hydraulic valve 38' comprises a solenoid valve 50' that is placed directly in the fuel return pipe 40.

Still with reference to the circuit of the first embodiment, the first pilot chamber P1 of the hydraulic valve is connected to the outlet 36b of the second pump 18b, and the second pilot chamber P2 is connected to the outlet 36a of the first pump 18a.

The operation of the hydraulic valve is then as follows. Initially, the force from the spring 46 is adjusted so that the slide 42 of the valve is positioned so as to cause the feed orifice OA to communicate with the high-pressure delivery orifice U1 so that the outlets from the two pumps are in communication with each other. Thereafter, depending on the position of the solenoid valve 50', operation is different.

When the solenoid valve 50' is not powered (valve closed), the pressure inside the second chamber P2 of the hydraulic valve is equivalent to the high pressure at the outlet 36a of the first pump plus the force from the spring 46. As a result, the slide 42 of the hydraulic valve remains in the position in which the feed orifice OA is in communication with the high-pressure delivery orifice U1 (as shown in FIG. 2).

When the solenoid valve 50' is powered (valve open), the pressure inside the first chamber P1 of the hydraulic valve is equivalent to the high pressure of the fuel at the outlet 36b of the second pump, while the second chamber P2 is connected to the branch pipe 40 (fuel at low pressure). Thus, the slide of the hydraulic valves moves into the second position in which the feed orifice OA and the high-pressure delivery orifice U1 are masked (as shown in FIG. 2A where the flow injected by the first pump is returned by the fuel return pipe 40).

As in the first embodiment, the solenoid valve 50' is controlled by the ECU which supplies the electrical power needed for controlling the valve.

Furthermore, the solenoid valve 50' may be of the on/off type or it may be of the flow rate regulator type. If it is of the regulator type, the returned flow of fuel injected by the first pump 18a may thus advantageously be regulated.

Furthermore, it is possible to imagine variants of this second embodiment. In particular, the solenoid valve may be positioned at a node between the outlet 36a of the first pump 18a and the branch pipe 44. Thus, it becomes possible to remove the slide from the hydraulic valve, with the function that it performs then being implemented by regulating the pressure of the solenoid valve (which should then have an inlet connected to the outlet 36a of the first pump and two outlets, one connected to the return pipe 40 and the other to the outlet 36b of the second pump). Furthermore, the presence of the diaphragm 49 in the channel 48 passing through the slide 42 of the hydraulic valve is not essential in this embodiment.

More generally, certain variants apply to both of the above-described embodiments.

In particular, the fuel return pipe 40 may lead to the low-pressure feed line 20, either upstream from the heat exchanger 14 as shown in the figures, or between the heat exchanger 14 and the main fuel filter 16, or else upstream from the main fuel filter (upstream from the split between the inlets to the pumps 18a and 18b of the high-pressure pumping system, or upstream from the inlet to the first pump 18a).

Furthermore, in an advantageous provision of the invention that is common to both embodiments, a check valve 60 is positioned in the fuel line connecting the high-pressure delivery orifice U1 of the hydraulic valve 38, 38' to the outlet 36b of the second pump 18b. In the embodiment of FIG. 2, this check valve 60 should be situated between the fuel line 28 for feeding the variable-geometry actuators and the high-pressure delivery orifice U1. Under such circumstances, the check valve thus serves to avoid parasitic flows to the low-pressure line via the fuel return pipe 40 while switching is taking place.

The invention claimed is:

1. A fuel feed circuit for an aeroengine, the circuit comprising:
   a high-pressure pumping system for delivering fuel at high pressure to combustion chamber injectors from a low-pressure feed line, the high-pressure pumping system including first and second-positive displacement gear pumps provided in parallel and driven simultaneously by the aeroengine, each of the first and second pumps including an inlet branching from an outlet of the low-pressure feed line at a substantially similar pressure;
   a hydraulic switch member interposed between respective outlets of the first and second pumps and comprising a hydraulic directional control valve including
   a feed orifice connected to the outlet of the first pump,
   a high-pressure delivery orifice connected to the outlet of the second pump, and
   a low-pressure delivery orifice connected to the low-pressure feed line by a fuel return pipe,
   the feed orifice being connected, in a first state of the hydraulic switch member, to the high-pressure delivery orifice, and in a second state of the hydraulic switch member, to the low-pressure delivery orifice, as a function of a controlled position of a slide of the hydraulic directional control valve such that in the first state of the hydraulic switch member, outlet flows from the first and second pumps are combined and flow to the combustion chamber injectors, and in the second state of the hydraulic switch member, some or all of the outlet flow from the first pump is discharged to the low-pressure feed line without flowing to the combustion chamber injectors, and some or all of the outlet flow from the second pump flows to the combustion chamber injectors;

an electrical control member for controlling the hydraulic switch member to cause the hydraulic switch member to pass from the first state to the second state;

wherein the hydraulic directional control valve further comprises a first pilot chamber and a second pilot chamber which are connected respectively to the outlet of the second pump and to the electrical control member, the electrical control member acting on a fuel pressure applied in the second pilot chamber, with the pressures applied in the first and second pilot chambers acting in opposition against each other to control the position of the slide of the hydraulic valve; and wherein the electrical control member comprises a solenoid valve placed on a fuel branch pipe connected firstly to the fuel return pipe and secondly to the second pilot chamber of the hydraulic directional control valve.

2. A circuit according to claim 1, wherein the first pilot chamber and second pilot chamber of the hydraulic directional control valve communicate with each other through a diaphragm.

3. A circuit according to claim 1, further comprising a check valve positioned between the high-pressure delivery orifice of the hydraulic directional control valve and the outlet of the second pump.

4. A circuit according to claim 1, wherein the first pump has pumping capacity greater than that of the second pump.

5. An aeroengine including a fuel feed circuit according to claim 1.

6. A circuit according to claim 1, wherein the slide of the hydraulic valve is movable in linear translation inside a cylinder, and the hydraulic directional control valve further comprises a spring which biases the slide such that the hydraulic switch member is in the first state, the spring being disposed in the second pilot chamber.

* * * * *